(12) United States Patent
Okada

(10) Patent No.: US 7,394,604 B2
(45) Date of Patent: Jul. 1, 2008

(54) OPTICAL APPARATUS

(75) Inventor: Tadanori Okada, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/834,571

(22) Filed: Aug. 6, 2007

(65) Prior Publication Data
US 2008/0030881 A1    Feb. 7, 2008

(30) Foreign Application Priority Data
Aug. 7, 2006    (JP) ............... 2006-214506

(51) Int. Cl.
*G02B 7/02*    (2006.01)
(52) U.S. Cl. ............... 359/825
(58) Field of Classification Search ............... 359/825
See application file for complete search history.

(56) References Cited
U.S. PATENT DOCUMENTS 4,472,033 A * 9/1984 Fukuhara et al. ............... 359/698
5,229,800 A * 7/1993 Kanno et al. ............... 396/137
6,456,796 B1 * 9/2002 Tanaka et al. ............... 396/131
2007/0058962 A1 * 3/2007 Natsume et al. ............... 396/103

FOREIGN PATENT DOCUMENTS

JP    08-146287    6/1996

* cited by examiner

*Primary Examiner*—Jordan M. Schwartz
*Assistant Examiner*—James C Jones
(74) *Attorney, Agent, or Firm*—Canon USA Inc IP Div

(57) ABSTRACT

An optical apparatus having a grip for gripping a camera body. The apparatus includes a lens element, a lens barrel configured to retain the lens element, a focus detection sensor disposed on an outer peripheral portion of the lens barrel, and a ring-shaped operation member configured to manually adjust at least focusing or zooming. The focus detection sensor is disposed on an outside of the ring-shaped operation member and on a same side as the grip of the camera body with respect to an optical axis of the lens element.

8 Claims, 3 Drawing Sheets

OPTICAL APPARATUS

BACKGROUND OF THE INVENTION

1. Field of the Invention

The present invention relates to an optical apparatus such as a digital camera, a video camera, a digital still camera, a television camera, and an interchangeable lens including a focus detection sensor for automatically focusing on an object.

2. Description of the Related Art

With a television auto focusing (TVAF) function in a video camera and a television camera, a video signal from an image sensor such as a charge-coupled device (CCD) is captured while a focusing lens is moved in a small amount to determine a focusing direction according to the difference in contrast values obtained before and after moving the focusing lens.

In such a TVAF system, when a focusing lens is disposed at a position close to an in-focus position, the focusing lens can immediately enter an in-focus state. However, in the case where the degree of blurring is high, it is necessary for a user to determine an in-focus position only after moving the focusing lens up to an end of a focusing lens movable range. Thus, the video image becomes unsightly for the user.

Thus, in a significantly defocused state, the contrast is very low, and a user cannot determine a focusing direction. Accordingly, in this case, it is necessary for a user to move the focusing lens to an infinitely distant end or a closest end to look for a position at which a contrast signal of a level is higher than a predetermined level. During this operation, the user is required to watch unfocused images, which causes the user to feel uncomfortable.

Meanwhile, a digital still camera employs a passive focus detection sensor as an auto focusing mechanism. A passive focus detection sensor can detect the difference between two images separated by a separator lens, and compute a focusing direction and an amount of unfocus, to immediately obtain an in-focus state. In recent years, a focus detection sensor is formed as a general-purpose module. Thus, a digital still camera has been downsized, the cost of manufacturing a digital still camera has been lowered, and the performance of a digital camera has been more stabilized.

A hybrid video camera has been marketed which uses the TVAF function for normal auto focusing and an inexpensive separate focus detection sensor module for moving a focusing lens to an in-focus position at a high speed in the case where the degree of blurring is high.

In a method discussed in Japanese Patent Application Laid-Open No. 08-146287, a focus detection sensor module is disposed inside a lens hood so as to eliminate parallax between an optical element and a range-finding area of the focus detection sensor.

In a conventional method, it is difficult to mount a lens hood on an optical apparatus with high accuracy because a focus detection sensor module is disposed inside a lens hood. Thus, it is difficult to align a range-finding area with a shooting area with high accuracy. Furthermore, it is necessary to provide an electrical contact between a focus detection sensor and a lens barrel in order to detach a focus detection sensor module together with a lens hood. Thus, in a conventional method, the configuration of the apparatus becomes complicated and it is difficult to stably perform an auto focus (AF) function.

SUMMARY OF THE INVENTION

The present invention is directed to an optical apparatus including a focus detection sensor, having a more stabilized configuration, and can implement auto focusing with high accuracy without interfering with a user handling an operation ring.

According to an aspect of the present invention, an optical apparatus having a grip configured to grip a camera body includes a lens element, a lens barrel configured to retain the lens element, a focus detection sensor disposed on an outer peripheral portion of the lens barrel, and a ring-shaped operation member configured to manually adjust at least focusing or zooming. The focus detection sensor is disposed on an outside of the ring-shaped operation member and on a same side as the grip of the camera body with respect to an optical axis of the lens element.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principle of the invention.

DETAILED DESCRIPTION OF THE EXEMPLARY EMBODIMENTS

Various exemplary embodiments, features, and aspects of the present invention will now herein be described in detail with reference to the drawings. It is to be noted that the relative arrangement of the components, the numerical expressions, and numerical values set forth in these embodiments are not intended to limit the scope of the present invention unless it is specifically stated otherwise.

Figure 1:
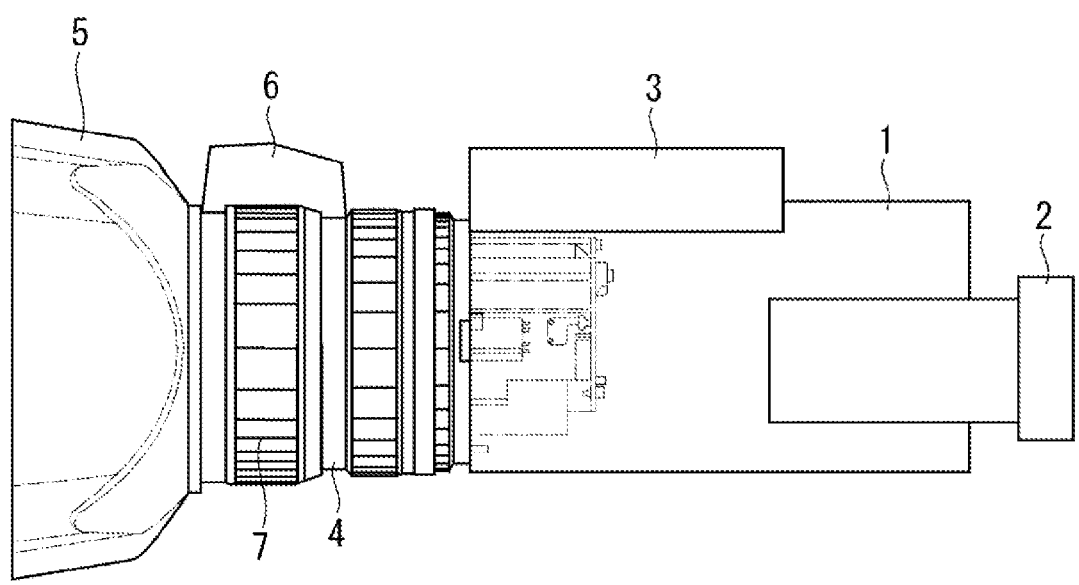
FIG. 1 illustrates a video camera that is an optical apparatus according to an exemplary embodiment of the present invention.

Now, an exemplary embodiment of the present invention will be described below. FIG. 1 illustrates a configuration of a video camera that is an optical apparatus according to the present exemplary embodiment. Referring to FIG. 1, the video camera according to the present exemplary embodiment includes a camera body 1, a viewfinder 2, and a grip 3. The viewfinder 2 is disposed in an upper rear portion of the camera body 1. The grip 3 is disposed in a right portion of the camera body 1 from the viewfinder 2 so that a user can stably grip the camera body 1.

Furthermore, the video camera includes a lens barrel 4 for shooting. The lens barrel 4 is fixedly mounted on the camera body 1. The lens barrel 4 includes an optical element. A lens hood 5 is mounted on a front end portion of the lens barrel 4.

A focus detection sensor 6 is fixedly mounted on the lens barrel 4 on an outer peripheral portion, to an outside of a ring-shaped operation member 7. The focus detection sensor 6 is mounted in a same direction as the grip 3 from the optical axis. The focus detection sensor 6 is disposed at a position distant from the user's left hand with which the user mainly operates the lens barrel 4 and the camera body 1.

As described above, the focus detection sensor 6 is disposed at a position and in a direction that do not interfere with a user operating the ring-shaped operation member 7 and the switches provided on the grip 3.

Figure 2:
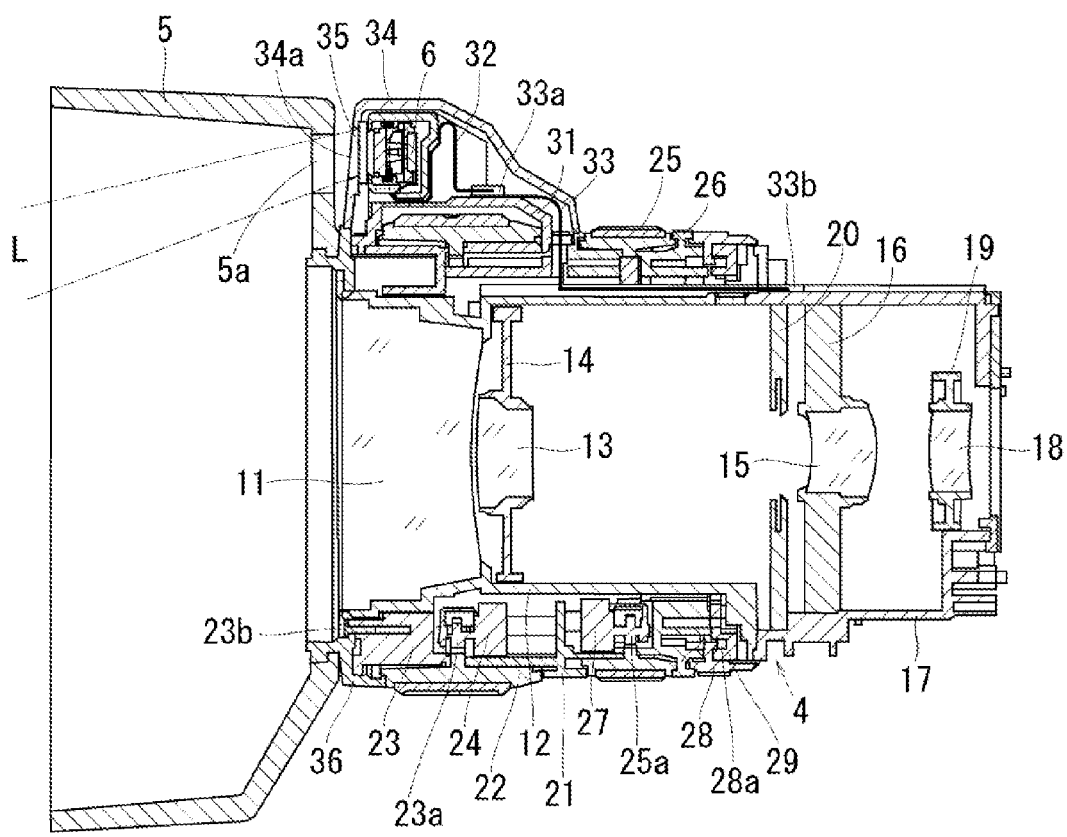
FIG. 2 is a cross section of the optical apparatus in a vertical direction according to the exemplary embodiment of the present invention.
Figure 3:
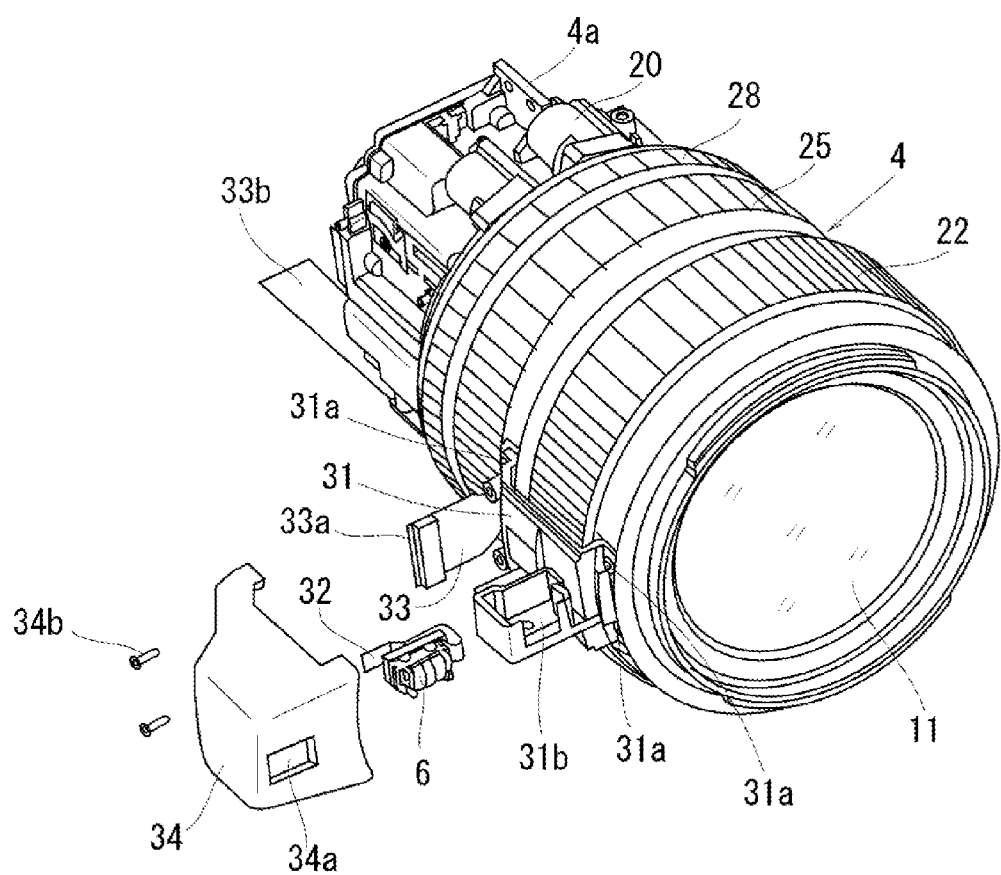
FIG. 3 is an exploded perspective view illustrating a mechanism for retaining a focus detection sensor according to the exemplary embodiment of the present invention.

FIG. 2 is a cross section of the lens barrel 4 in a vertical direction. FIG. 3 is an exploded perspective view illustrating a mechanism for retaining the focus detection sensor 6.

A stationary positive lens 11, which is a first lens unit, is fixedly mounted in a front stationary tube 12. A negative lens 13, which is a second lens unit for performing variation, is retained in a second lens barrel 14.

The second lens barrel 14 is driven by a motor (not shown) and can move along the optical axis during zooming.

A fixed positive lens 15, which is a third lens unit, is retained in a third lens barrel 16. The third lens barrel 16 is retained on a rear stationary tube 17.

A positive lens 18, which is a fourth lens unit, is retained in a fourth lens barrel 19. The fourth lens unit (positive lens) 18 is driven by a motor (not shown) so as to move along the optical axis and perform focusing.

A diaphragm unit 20 can be fixedly mounted on the rear stationary tube 17 with a screw. An image sensor (not shown) such as a CCD is mounted at the back of the rear stationary tube 17 so as to capture a video signal. Furthermore, a seat 4a for mounting the entire lens barrel 4 on the camera body 1 is provided on an outer peripheral of the rear stationary tube 17.

An outer stationary tube 21 is fixedly mounted on an outer periphery of the front stationary tube 12. A manual focus (MF) ring 22 is disposed at the front of the outer stationary tube 21. The MF ring 22 is pinched by an MF ring pressing ring 23, which is fixedly mounted on the outer stationary tube 21. The MF ring 22 is rotatably retained at a fixed position.

An encoder 24 engages with a gear 23a, which is disposed on an inner periphery of the MF ring 22. Thus, a rotation angle of the MF ring 22 can be detected as a pulse signal.

A manual zoom (MZ) ring 25 for performing manual zooming is disposed in a rear portion of the outer stationary tube 21. The MZ ring 25 is pinched by an MZ ring pressing ring 26. The MZ ring pressing ring 26 is fixedly mounted on the outer stationary tube 21. The MZ ring 25 is rotatably retained at a fixed position.

An encoder 27, which is similar to the encoder 24, engages with a gear 25a. The gear 25a is disposed on an inner periphery of the MZ ring 25. Thus, a rotation angle of the MZ ring 25 can be detected as a pulse signal.

Furthermore, a diaphragm ring 28 for manually adjusting a diaphragm is disposed at the back of the MZ ring pressing ring 26. The diaphragm ring 28 is rotatably retained by a diaphragm ring pressing ring 29 at a fixed position. Pits and projections 28a are formed in a shape like comb teeth on the diaphragm ring 28. An interrupter (not shown) detects the pits and projections 28a to detect a rotation angle of the diaphragm ring 28.

The encoders 24 and 27 and the interrupter are wired to each other by a flexible printed circuit board (not shown) and are electrically connected to a control circuit (not shown) installed in the camera body 1.

A sensor retaining base 31 is disposed so as to cover one portion of the MF ring 22. The sensor retaining base 31 can be fixed on the MF ring pressing ring 23 and the outer stationary tube 21 with a screw 31a to retain the focus detection sensor 6.

The focus detection sensor 6 includes a separator lens for separating an image into two portions, a line sensor for detecting the contrast, and a passive focus detection sensor unit on which a signal processing circuit is integrally provided.

The focus detection sensor 6 is retained inside a concave portion 31b of the sensor retaining base 31. Tilting of the focus detection sensor 6 is adjusted with a dedicated tool so as to align the position of the range-finding area of the focus detection sensor with the shooting area of the lens. The focus detection sensor 6 is fixed with an ultraviolet (UV) curable adhesive.

Since the lens according to the present exemplary embodiment is a zoom lens, adjustment is performed so that the range-finding area of the focus detection sensor 6 reaches its center at a specific object distance in a shooting area at a telephoto end. The object distance is set so that the range-finding area does not go out of a target image, in a shootable range from a closest object to an infinitely-distant object.

When an optical element having a long focal length is used, the shooting area becomes small. Accordingly, high accuracy is required in mounting the focus detection sensor 6. Thus, it is a requisite to adjust and mount the focus detection sensor 6 with high accuracy. Accordingly, the focus detection sensor 6 is mounted at a position close to the optical element.

A flexible printed circuit board 32 transmits a signal from the focus detection sensor 6. The flexible printed circuit board 32 is electrically connected to a flexible printed circuit board 33 via a connector 33a. The flexible printed circuit board 33 protrudes from the lens barrel 4. An auto focus (AF) signal is transmitted from a contact point 33b to the control circuit provided within the camera body 1. The contact point 33b extends to the rear portion of the lens barrel 4.

A sensor cover 34 covers the focus detection sensor 6. An aperture portion 34a having a cover glass 35 is provided at the front of the sensor cover 34. The cover glass 35 allows light to be incident into the focus detection sensor 6. The sensor cover 34 can be fixedly mounted on the sensor retaining base 31 with a screw 34b.

The lens hood 5, which is detachably mounted on the lens barrel 4 at the front portion of the lens barrel 4, is detachably fixed to a front ring 36 by a bayonet method. The front ring 36 can be fixed on the MF ring pressing ring 23 with a screw 23b. The focus detection sensor 6 is disposed at a position closer to the optical axis of the optical element than the outer periphery of the lens hood 5.

An aperture 5a is provided in the back of the lens hood 5 so that the aperture 5a does not interfere with a light flux L that is incident on the focus detection sensor 6. Thus, the focus detection sensor 6 can be disposed at a position close to the optical axis of the optical element. Accordingly, parallax between a target image and a range-finding position of the focus detection sensor 6 can be reduced.

The video camera according to the present exemplary embodiment performs TVAF according to a contrast signal from the image sensor.

In TVAF performed by a conventional video camera, a focusing lens is micro-vibrated by wobbling to detect the level of a contrast signal, and thus a moving direction of the focusing lens is determined to perform focusing. Accordingly, in a significantly unfocused state, the above-described problem can arise.

The focus detection sensor 6 according to the present exemplary embodiment is provided to prevent such a problem as an auxiliary means. With the passive type focus detection sensor 6, the focusing direction and the amount of shifting can be instantly computed even in the case where the degree of unfocus is very large. Accordingly, the focusing lens can be moved to an in-focus position at a high speed.

Thus, using the focus detection sensor 6, the focusing lens can be moved to a position close to the in-focus position at a high speed, and a highly accurate in-focus state can be maintained by the TVAF performed according to an image signal. Accordingly, auto focusing can be performed at a high speed. Thus, a user does not feel uncomfortable in shooting an image with the video camera according to the present exemplary embodiment.

As described above, the focus detection sensor 6 is disposed at a position close to the optical element on the same side as the camera grip 3 on the outer periphery of the lens barrel 4. Accordingly, the range-finding area of the focus detection sensor 6 and a target image can be aligned with high accuracy. In addition, the user operating manual adjustment rings (the MF ring 22, the MZ ring 25, and the diaphragm ring 28) cannot be interfered with when focusing is manually adjusted.

Furthermore, in the present exemplary embodiment, the aperture 5a for the focus detection sensor 6 is provided in the lens hood 5. Accordingly, the focus detection sensor 6 can be disposed at a position close to the optical axis of the optical element. Thus, the amount of parallax can be reduced.

In the optical apparatus according to the present exemplary embodiment, the focus detection sensor 6 is disposed on the same side as the grip 3. Accordingly, interference with a user operation from a protruding portion of the focus detection sensor 6 can be prevented when the user operates the manual adjustment ring to perform focusing and zooming.

In addition, the focus detection sensor 6 is not inside the lens hood 5 but directly fixed on the lens barrel 4. Accordingly, the range-finding area and a target image can be aligned with good accuracy. Thus, auto focusing can be performed with high accuracy.

Furthermore, the distance between the focus detection sensor 6 and the optical element can be shortened. Accordingly, parallax in the range-finding area of a target image can be reduced.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-214506 filed Aug. 7, 2006, which is hereby incorporated by reference herein in its entirety.

What is claimed is:

1. An optical apparatus having a grip configured to grip a camera body, the optical apparatus comprising:
    a lens element;
    a lens barrel configured to retain the lens element;
    a focus detection sensor disposed on an outer peripheral portion of the lens barrel; and
    a ring-shaped operation member configured to manually adjust at least focusing or zooming,
    wherein the focus detection sensor is disposed on an outside of the ring-shaped operation member and on a same side as the grip of the camera body with respect to an optical axis of the lens element.

2. The optical apparatus according to claim 1, wherein the ring-shaped operation member includes a manual focusing operation ring.

3. The optical apparatus according to claim 1, wherein the focus detection sensor includes a passive type sensor.

4. The optical apparatus according to claim 1, further comprising a lens hood fixed on a front end of the lens barrel,
    wherein the focus detection sensor is disposed closer to the optical axis of the lens element than the outer periphery of the lens hood, and
    wherein the lens hood has an aperture through which a light flux can pass that is incident into the focus detection sensor.

5. The optical apparatus according to claim 4, wherein the lens hood can be detached from the lens barrel.

6. An optical apparatus comprising:
    a lens element;
    a lens barrel configured to retain the lens element;
    a focus detection sensor disposed on an outer peripheral portion of the lens barrel; and
    a lens hood fixed on a front end of the lens barrel,
    wherein the focus detection sensor is disposed closer to the lens element than an outer periphery of the lens hood, and
    wherein the lens hood has an aperture through which a light flux can pass that is incident into the focus detection sensor.

7. The optical apparatus according to claim 6, wherein the focus detection sensor includes a passive type sensor.

8. The optical apparatus according to claim 6, wherein the lens hood can be detached from the lens barrel.

* * * * *